(12) United States Patent
Sood et al.

(10) Patent No.: US 8,621,044 B2
(45) Date of Patent: Dec. 31, 2013

(54) SMOOTH, STATELESS CLIENT MEDIA STREAMING

(75) Inventors: Vishal Sood, Bothell, WA (US); Jack E. Freelander, Monroe, WA (US); Anirban Roy, Kirkland, WA (US); Lin Liu, Sammamish, WA (US); Geqiang (Sam) Zhang, Redmond, WA (US); Krishna Duggaraju, Renton, WA (US); Sudheer Sirivara, Redmond, WA (US); John A. Bocharov, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 12/405,215

(22) Filed: Mar. 16, 2009

(65) Prior Publication Data

US 2010/0235472 A1 Sep. 16, 2010

(51) Int. Cl.
*G06F 15/16* (2006.01)
*G06F 15/177* (2006.01)

(52) U.S. Cl.
USPC ............ 709/219; 709/217; 709/220; 709/222

(58) Field of Classification Search
USPC .................... 709/217–222, 230–233; 725/62
See application file for complete search history.

(56) References Cited

U.S. PATENT DOCUMENTS

| | | | |
|---|---|---|---|
| 7,085,842 B2 | 8/2006 | Reid et al. | |
| 7,212,574 B2 * | 5/2007 | Abrams et al. | 375/240.25 |
| 7,478,164 B1 * | 1/2009 | Lango et al. | 709/231 |
| 7,689,510 B2 * | 3/2010 | Lamkin et al. | 705/51 |
| 2002/0023165 A1 * | 2/2002 | Lahr | 709/231 |
| 2002/0078174 A1 * | 6/2002 | Sim et al. | 709/219 |
| 2003/0014488 A1 * | 1/2003 | Dalal et al. | 709/204 |
| 2003/0018978 A1 | 1/2003 | Singal et al. | |
| 2004/0131340 A1 * | 7/2004 | Antoun et al. | 386/125 |
| 2004/0186733 A1 * | 9/2004 | Loomis et al. | 704/278 |
| 2005/0190915 A1 * | 9/2005 | Pare et al. | 380/201 |
| 2005/0251832 A1 * | 11/2005 | Chiueh | 725/62 |

(Continued)

FOREIGN PATENT DOCUMENTS

CN 101163238 A 4/2008

OTHER PUBLICATIONS

"Light Up the Web: Silverlight 2 Technical Reviewers Guide", retrieved at <<http://download.microsoft.com/download/8/e/4/8e4a41a0-4b29-49b6-8e17-0da540f27d1b/Silverlight_2_Reviewers_Guide.pdf>>, Oct. 2008, pp. 1-59.

(Continued)

*Primary Examiner* — Tae Kim

(57) ABSTRACT

An adaptive streaming system is described herein that provides a stateless connection between the client and server for streaming media playback in which the data is formatted in a manner that allows the client to make decisions and react more quickly to changing network conditions. The client requests uniform chunks of media from the server that include a portion of the media. The adaptive streaming system requests portions of a media file or of a live streaming event in small-sized chunks each having a distinguished URL. This allows streaming media data to be cached by existing Internet cache infrastructure. Each chunk contains metadata information that describes the encoding of the chunk and media content for playback by the client. The server may provide chunks in multiple encodings so that the client can switch quickly to chunks of a different bit rate or playback speed.

20 Claims, 4 Drawing Sheets

(56) References Cited

U.S. PATENT DOCUMENTS

| | | | |
|---|---|---|---|
| 2006/0095472 | A1 | 5/2006 | Krikorian et al. |
| 2006/0184697 | A1 | 8/2006 | Virdi et al. |
| 2006/0287912 | A1 | 12/2006 | Raghuvamshi |
| 2007/0162487 | A1* | 7/2007 | Frailey ............... 707/102 |
| 2007/0162571 | A1* | 7/2007 | Gupta et al. ............ 709/219 |
| 2007/0162611 | A1* | 7/2007 | Yu et al. ............. 709/232 |
| 2007/0168541 | A1* | 7/2007 | Gupta et al. ............ 709/231 |
| 2007/0168542 | A1* | 7/2007 | Gupta et al. ............ 709/231 |
| 2007/0180135 | A1* | 8/2007 | Kenrick et al. ............ 709/231 |
| 2007/0276836 | A1 | 11/2007 | Chatterjee et al. |
| 2008/0022005 | A1* | 1/2008 | Wu et al. ............. 709/231 |
| 2008/0172718 | A1 | 7/2008 | Bradley |
| 2008/0232371 | A1* | 9/2008 | Hildreth et al. ........... 370/392 |
| 2008/0256514 | A1 | 10/2008 | Shiflet |
| 2008/0267213 | A1* | 10/2008 | Deshpande ............ 370/468 |
| 2010/0226444 | A1* | 9/2010 | Thevathasan et al. ... 375/240.29 |
| 2010/0235438 | A1* | 9/2010 | Narayanan et al. ......... 709/203 |

OTHER PUBLICATIONS

Wu, et al., "Next Generation Mobile Multimedia Communications: Media Codec and Media Transport Perspectives", China Communications, retrieved at <<http://www.china-cic.org.cn/english/digital%20library/200610/4.pdf>>, Oct. 2006, pp. 30-44.

"International Search Report", Mailed Date: Oct. 26, 2010, Application No. PCT/US2010/026707, Filed Date: Mar. 9, 2010, pp. 9.

Chinese Patent Application No. 201080012702.1, Fourth Office Action dated Aug. 12, 2013, 6 pages, including English translation.

Chinese Patent Application No. 201080012702.1, Response to Fourth Office Action dated Aug. 28, 2013, 11 pages, including English translation of claims.

Chinese Patent Application No. 201080012702.1, First Office Action dated Aug. 3, 2012, 12 pages, including English translation.

Chinese Patent Application No. 201080012702.1, Response to First Office Action, dated Dec. 18, 2012, 12 pages, including English translation of claims.

Chinese Patent Application No. 201080012702.1, Second Office Action dated Jan. 22, 2013, 8 pages, including English translation.

Chinese Patent Application No. 201080012702.1, Response to Second Office Action, dated Mar. 26, 2013, 12 pages, including English translation of claims.

Chinese Patent Application No. 201080012702.1, Third Office Action, dated May 30, 2013, 9 pages, including English translation.

Chinese Patent Application No. 201080012702.1, Response to Third Office Action dated Jun. 17, 2013, 6 pages, including English translation of claims.

* cited by examiner

SMOOTH, STATELESS CLIENT MEDIA STREAMING

BACKGROUND

Streaming media is multimedia that is constantly received by, and normally presented to, an end-user (using a client) while it is being delivered by a streaming provider (using a server). Several protocols exist for streaming media, including the Real-time Streaming Protocol (RTSP), Real-time Transport Protocol (RTP), and the Real-time Transport Control Protocol (RTCP), which streaming applications often use together. The Real Time Streaming Protocol (RTSP), developed by the Internet Engineering Task Force (IETF) and created in 1998 as Request For Comments (RFC) 2326, is a protocol for use in streaming media systems, which allows a client to remotely control a streaming media server, issuing VCR-like commands such as "play" and "pause", and allowing time-based access to files on a server.

The sending of streaming data itself is not part of the RTSP protocol. Most RTSP servers use the standards-based RTP as the transport protocol for the actual audio/video data, acting somewhat as a metadata channel. RTP defines a standardized packet format for delivering audio and video over the Internet. RTP was developed by the Audio-Video Transport Working Group of the IETF and first published in 1996 as RFC 1889, and superseded by RFC 3550 in 2003. The protocol is similar in syntax and operation to Hypertext Transport Protocol (HTTP), but RTSP adds new requests. While HTTP is stateless, RTSP is a stateful protocol. RTSP uses a session ID to keep track of sessions when needed. RTSP messages are sent from client to server, although some exceptions exist where the server will send messages to the client.

Streaming applications usually use RTP in conjunction with RTCP. While RTP carries the media streams (e.g., audio and video) or out-of-band signaling (dual-tone multi-frequency (DTMF)), streaming applications use RTCP to monitor transmission statistics and quality of service (QoS) information. RTP allows only one type of message, one that carries data from the source to the destination. In many cases, there is a need for other messages in a session. These messages control the flow and quality of data and allow the recipient to send feedback to the source or sources. RTCP is a protocol designed for this purpose. RTCP has five types of messages: sender report, receiver report, source description message, bye message, and application-specific message. RTCP provides out-of-band control information for an RTP flow and partners with RTP in the delivery and packaging of multimedia data, but does not transport any data itself. Streaming applications use RTCP to periodically transmit control packets to participants in a streaming multimedia session. One function of RTCP is to provide feedback on the quality of service RTP is providing. RTCP gathers statistics on a media connection and information such as bytes sent, packets sent, lost packets, jitter, feedback, and round trip delay. An application may use this information to increase the quality of service, perhaps by limiting flow or using a different codec or bit rate.

One problem with existing media streaming architectures is the tight coupling between server and client. The stateful connection between client and server creates additional server overhead, because the server tracks the current state of each client. This also limits the scalability of the server. In addition, the client cannot quickly react to changing conditions, such as increased packet loss, reduced bandwidth, user requests for different content or to modify the existing content (e.g., speed up or rewind), and so forth, without first communicating with the server and waiting for the server to adapt and respond. Often, when a client reports a lower available bandwidth (e.g., through RTCP), the server does not adapt quickly enough causing breaks in the media to be noticed by the user on the client as packets that exceed the available bandwidth are not received and new lower bit rate packets are not sent from the server in time. To avoid these problems, clients often buffer data, but buffering introduces latency, which for live events may be unacceptable.

In addition, the Internet contains many types of downloadable media content items, including audio, video, documents, and so forth. These content items are often very large, such as video in the hundreds of megabytes. Users often retrieve documents over the Internet using HTTP through a web browser. The Internet has built up a large infrastructure of routers and proxies that are effective at caching data for HTTP. Servers can provide cached data to clients with less delay and by using fewer resources than re-requesting the content from the original source. For example, a user in New York may download a content item served from a host in Japan, and receive the content item through a router in California. If a user in New Jersey requests the same file, the router in California may be able to provide the content item without again requesting the data from the host in Japan. This reduces the network traffic over possibly strained routes, and allows the user in New Jersey to receive the content item with less latency.

Unfortunately, live media often cannot be cached using existing protocols, and each client requests the media from the same server or set of servers. In addition, when streaming media can be cached, specialized cache hardware is often involved, rather than existing and readily available HTTP-based Internet caching infrastructure. The lack of caching limits the number of concurrent viewers and requests that the servers can handle, and limits the attendance of a live event. The world is increasingly using the Internet to consume up to the minute live information, such as the record number of users that watched live events such as the opening of the 2008 Olympics via the Internet. The limitations of current technology are slowing adoption of the Internet as a medium for consuming this type of media content.

SUMMARY

An adaptive streaming system is described herein that provides a stateless connection between the client and server for streaming media playback in which the data is formatted in a manner that allows the client to make decisions traditionally performed by the server and therefore react more quickly to changing network conditions. The client requests uniform chunks of media from the server that include a portion of the media. The adaptive streaming system requests portions of a media file or of a live streaming event in small-sized chunks each having a distinguished URL. This allows existing Internet cache infrastructure to cache streaming media, thereby allowing more clients to view the same content at about the same time. As the event progresses, the client continues requesting chunks until the end of the event or media. Each chunk contains metadata information that describes the encoding of the chunk and media content for playback by the client. The server may provide chunks in multiple encodings so that the client can switch quickly to chunks of a different bit rate or playback speed. Thus, the adaptive streaming system provides an improved experience to the user with fewer breaks in streaming media playback, and an increased likelihood that the client will receive the media with lower latency from a more local cache server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
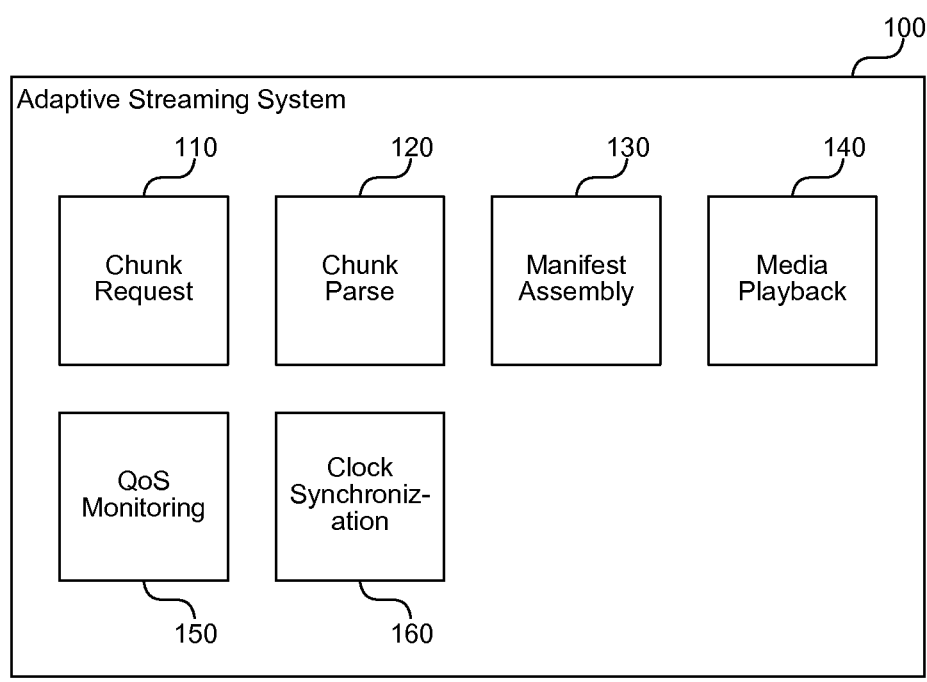
FIG. 1 is a block diagram that illustrates components of the adaptive streaming system, in one embodiment.

An adaptive streaming system is described herein that provides a stateless connection between the client and server for streaming media playback in which the data is formatted in a manner that allows the client to make decisions often left to the server in past protocols, and therefore react more quickly to changing network conditions. In addition, the adaptive streaming system operates in a manner that allows existing Internet cache infrastructure to cache streaming media data, thereby allowing more clients to view the same content at about the same time. The adaptive streaming system requests portions of a media file or of a live streaming event in small-sized chunks each having a distinguished URL. Each chunk may be a media file in its own right or may be a part of a whole media file. As the event progresses, the client continues requesting chunks until the end of the event. Each chunk contains metadata information that describes the encoding of the chunk and media content for playback by the client. The server may provide chunks in multiple encodings so that the client can, for example, switch quickly to chunks of a different bit rate or playback speed. Because the chunks adhere to World Wide Web Consortium (W3C) HTTP standards, the chunks are small enough to be cached, and the system provides the chunks in the same way to each client, the chunks are naturally cached by existing Internet infrastructure without modification. Thus, the adaptive streaming system provides an improved experience to the user with fewer breaks in streaming media playback, and an increased likelihood that the client will receive the media with lower latency from a more local cache server. Because the connection between the client and server is stateless, the same client and server need not be connected for the duration of a long event. The stateless system described herein has no server affinity, allowing clients to piece together manifests from servers that may have begun at different times, and also allowing server administrators to bring up or shut down origin servers as load dictates.

In some embodiments, the adaptive streaming system uses a new data transmission format between the server and client. The client requests chunks of media from a server that include a portion of the media. For example, for a 10-minute file, the client may request 2-second chunks. Note that unlike typical streaming where the server pushes data to the client, in this case the client pulls media chunks from the server. In the case of a live stream, the server may be creating the media on the fly and producing chunks to respond to client requests. Thus, the client may only be several chunks behind the server in terms of how fast the server creates chunks and how fast the client requests chunks.

Each chunk contains metadata and media content. The metadata may describe useful information about the media content, such as the bit rate of the media content, where the media content fits into a larger media element (e.g., this chunk represents offset 1:10 in a 10 minute video clip), the codec used to encode the media content, and so forth. The client uses this information to place the chunk into a storyboard of the larger media element and to properly decode and playback the media content.

FIG. 1 is a block diagram that illustrates components of the adaptive streaming system, in one embodiment. The adaptive streaming system 100 includes a chunk request component 110, a chunk parsing component 120, a manifest assembly component 130, a media playback component 140, a QoS monitoring component 150, and a clock synchronization component 160. Each of these components is described in further detail herein. The adaptive streaming system 100 as described herein operates primarily at a client computer system. However, those of ordinary skill in the art will recognize that various components of the system may be placed at various locations within a content network environment to provide particular positive results.

Figure 2:
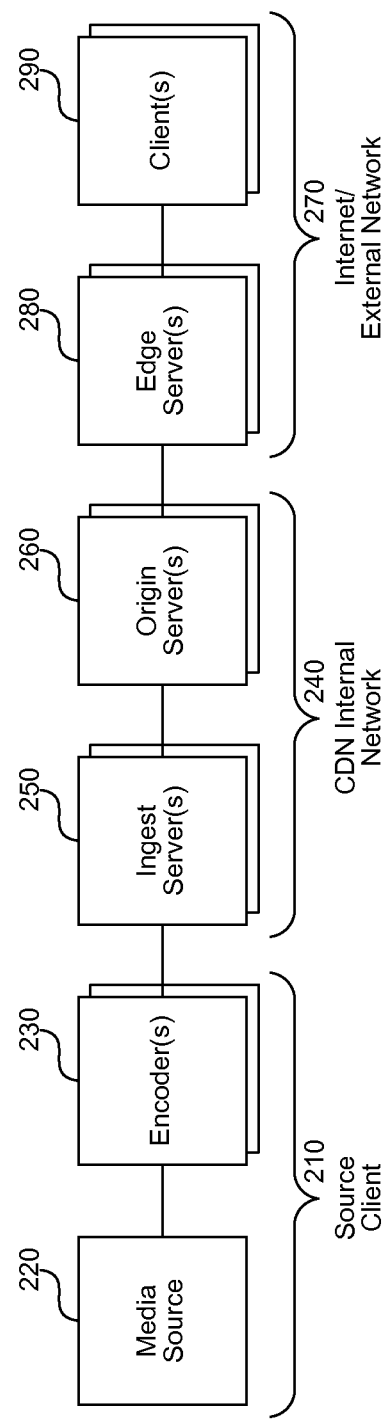
FIG. 2 is a block diagram that illustrates an operating environment of the smooth streaming system using Microsoft Windows and IIS, in one embodiment.

The chunk request component 110 makes requests from the client for individual media chunks from the server. As shown in FIG. 2, the client's request may pass first to an edge server (e.g., an Internet cache), then to an origin server, and then to an ingest server. At each stage, if the requested data is found, then the request does not go to the next level. For example, if the edge server has the requested data, then the client receives the data from the edge server and the origin server does not receive the request. Each chunk may have a Uniform Resource Locator (URL) that individually identifies the chunk. Internet cache servers are good at caching server responses to specific URL requests (e.g., HTTP GET). Thus, when the first client calls through to the server to get a chunk, the edge servers cache that chunk and subsequent clients that request the same chunk may receive the chunk from the edge server (based on the cache lifetime and server time to live (TTL) settings). The chunk request component 110 receives the chunk and passes it to the chunk parsing component 120 for interpretation.

The chunk parsing component 120 interprets the format of a media chunk received by the chunk request component 110 and separates the chunk into its component parts. Typically, the chunk includes a header portion containing metadata, and a data portion containing media content. The chunk parsing component provides the metadata to the manifest assembly component 130 and the media content to the media playback component 140.

The manifest assembly component 130 builds a manifest that describes the media element to which received media content belongs. Large media files that clients download as a whole (i.e., not streamed) often include a manifest describing the whole file, the codecs and bit rates used to encode various portions of the file, markers about meaningful positions with the file, and so forth. During streaming, particularly live content, a server cannot provide a complete manifest because the event is still ongoing. Thus, the server provides as much of the manifest as it can through the metadata in the media chunks. The server may also provide an application-programming interface (API), such as a predefined URL, for the client to request the manifest up to the current point in the media stream. This can be useful when the client joins a live, streamed event after the event is already in progress. The manifest allows the client to request previously streamed portions of the media element (e.g., by rewinding), and the client continues to receive new portions of the manifest through the metadata of the streamed media chunks.

The manifest assembly component 130 builds a manifest similar to that available for a complete media file. Thus, as the event proceeds if the user wants to skip backwards in the media (e.g., rewind or jump to a particular position), then skip forward again, the user can do so and the client uses the assembled manifest to find the appropriate chunk or chunks to playback to the user. When the user pauses, the system 100 may continue to receive media chunks (or only the metadata portion of chunks based on a distinguished request URL), so that the manifest assembly component 130 can continue to build the manifest and be ready for any user requests (e.g., skip to the current live position or play from the pause point) after the user is done pausing. The client-side assembled manifest allows the client to play the media event back as on-demand content as soon as the event is over, and to skip around within the media event as it is going on.

The media playback component 140 plays back received media content using the client hardware. The media playback component 140 may invoke one or more codecs to interpret the container within which the media content is transported and to decompress or otherwise decode the media content from a compressed format to a raw format (e.g., YV12, RGBA, or PCM audio samples) ready for playback. The media playback component 140 may then provide the raw format media content to an operating system API (e.g., Microsoft DirectX) for playback on local computer system sound and video hardware, such as a display and speakers.

The QoS monitoring component 150 analyzes the success of receiving packets from the server and adapts the client's requests based on a set of current network and other conditions. For example, if the client is routinely receiving media chunks late, then the component 150 may determine that the bandwidth between the client and the server is inadequate for the current bit rate, and the client may begin requesting media chunks at a lower bit rate. QoS monitoring may include measurement of other heuristics, such as render frame rate, window size, buffer size, frequency of rebuffering, and so forth. Media chunks for each bit rate may have a distinguished URL so that chunks for various bit rates are cached by Internet cache infrastructure. Note that the server does not track client state and does not know what bit rate any particular client is currently playing. The server can simply provide the same media element in a variety of bit rates to satisfy potential client requests under a range of conditions. In addition, the initial manifest and/or metadata that the client receives may include information about the bit rates and other encoding properties available from the server, so that the client can choose the encoding that will provide a good client experience.

Note that when switching bit rates, the client simply begins requesting the new bit rate and playing back the new bit rate chunks as the client receives the chunks. The client does not have to send control information to the server and wait for the server to adapt the stream. The client's request may not even reach the server due to a cache in between the client and server satisfying the request. Thus, the client is much quicker to react than clients in traditional media streaming systems are, and the burden on the server of having different clients connecting under various current conditions is reduced dramatically. In addition, because current conditions tend to be localized, it is likely that many clients in a particular geographic region or on a particular Internet service provider (ISP) will experience similar conditions and will request similar media encodings (e.g., bit rates). Because caches also tend to be localized, it is likely that the clients in a particular situation will find that the cache near them is "warm" with the data that they each request, so that the latency experienced by each client will be low.

The clock synchronization component 160 synchronizes the clocks of the server and the client. Although absolute time is not generally relevant to the client and server, being able to identify a particular chunk and knowing the rate (i.e. cadence) at which to request chunks is relevant to the client. For example, if the client requests data too quickly, the server will not yet have the data and will respond with error responses (e.g., an HTTP 404 not found error response) creating many spurious requests that unnecessarily consume bandwidth. On the other hand, if the client requests data too slowly, then the client may not have data in time for playback creating noticeable breaks in the media played back to the user. Thus, the client and server work well when the client knows the rate at which the server is producing new chunks and knows where the current chunk fits into the overall timeline. The clock synchronization component 160 provides this information by allowing the server and client to have a similar clock value at a particular time. The server may also mark each media chunk with the time at which the server created the chunk.

Clock synchronization also gives the server a common reference across each of the encoders. For example, the server may encode data in multiple bit rates and using multiple codecs at the same time. Each encoder may reference encoded data in a different way, but the timestamp can be set in common across all encoders. In this way, if a client requests a particular chunk, the client will get media representing the same period regardless of the encoding that the client selects.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

FIG. 2 is a block diagram that illustrates an operating environment of the smooth streaming system using Microsoft Windows and IIS, in one embodiment. The environment typically includes a source client 210, a content delivery network 240, and an external network 270. The source client is the source of the media or live event. The source client includes a media source 220 and one or more encoders 230. The media source 220 may include cameras each providing multiple camera angles, microphones capture audio, slide presentations, text (such as from a closed captioning service), images, and other types of media. The encoders 230 encode the data from the media source 220 in one or more encoding formats in parallel. For example, the encoders 230 may produce encoded media in a variety of bit rates.

The content delivery network 240 includes one or more ingest servers 250 and one or more origin servers 260. The ingest servers 250 receive encoded media in each of the encoding formats from the encoders 230 and create a manifest describing the encoded media. The ingest servers 250 may create and store the media chunks described herein or may create the chunks on the fly as they are requested. The ingest servers 250 can receive pushed data, such as via an HTTP POST, from the encoders 230, or via pull by requesting data from the encoders 230. The encoders 230 and ingest servers 250 may be connected in a variety of redundant configurations. For example, each encoder may send encoded media data to each of the ingest servers 250, or only to one ingest server until a failure occurs. The origin servers 260 are the servers that respond to client requests for media chunks. The origin servers 260 may also be configured in a variety of redundant configurations.

The external network 270 includes edge servers 280 and other Internet (or other network) infrastructure and clients 290. When a client makes a request for a media chunk, the client addresses the request to the origin servers 260. Because of the design of network caching, if one of the edge servers 280 contains the data, then that edge server may respond to the client without passing along the request. However, if the data is not available at the edge server, then the edge server forwards the request to one of the origin servers 260. Likewise, if one of the origin servers 260 receives a request for data that is not available, the origin server may request the data from one of the ingest servers 250.

Figure 3:
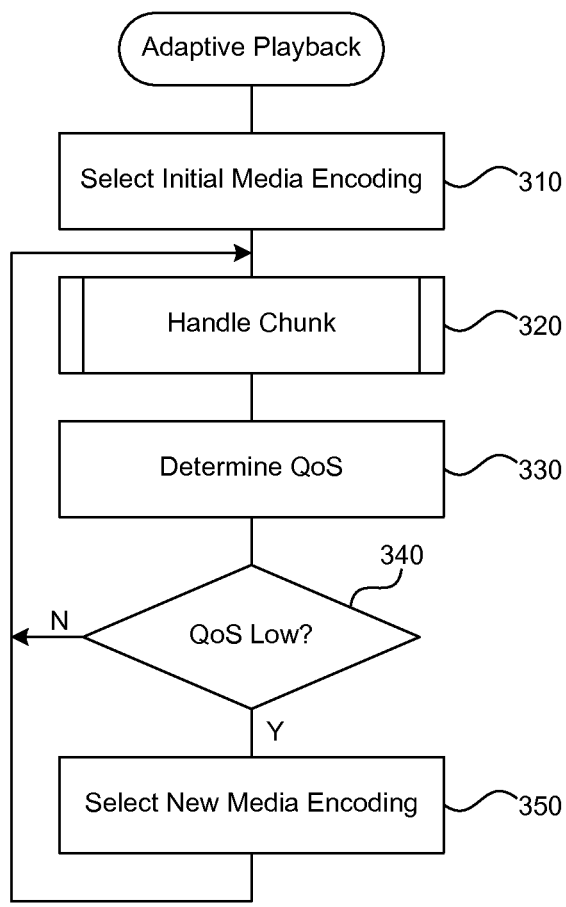
FIG. 3 is a flow diagram that illustrates the processing of the adaptive streaming system on a client to playback media, in one embodiment.

FIG. 3 is a flow diagram that illustrates the processing of the adaptive streaming system on a client to playback media, in one embodiment. Beginning in block 310, the system selects an initial encoding at which to request encoded media from the server. For example, the system may initially select a lowest available bit rate. The system may have previously sent a request to the server to discover the available bit rates and other available encodings. Continuing in block 320, the system requests and plays a particular chunk of the media, as described further with reference to FIG. 4. Continuing in block 330, the system determines a quality of service metric based on the requested chunk. For example, the chunk may include metadata for as many additional chunks as the server is currently storing, which the client can use to determine how fast the client is requesting chunks relative to how fast the server is producing chunks. This process is described in further detail herein.

Continuing in decision block 340, if the system determines that the current QoS metric is too low and the client connection to the server cannot handle the current encoding, then the system continues at block 350, else the system loops to block 320 to handle the next chunk. Continuing in block 350, the system selects a different encoding of the media, wherein the system selects a different encoding by requesting data from a different URL for subsequent chunks from the server. For example, the system may select an encoding that consumes half the bandwidth of the current encoding. Likewise, the system may determine that the QoS metric indicates that the client can handle a higher bit rate encoding, and the client may request a higher bit rate for subsequent chunks. In this way, the client adjusts the bit rate up and down based on current conditions.

Although FIG. 3 illustrates the QoS determination as occurring after each chunk, those of ordinary skill in the art will recognize that other QoS implementations are common, such as waiting a fixed number of packets or chunks (e.g., every 10th packet) to make a QoS determination. After block 350, the system loops to block 320 to handle the next chunk if one is available or completes if no further media is available (not shown).

Figure 4:
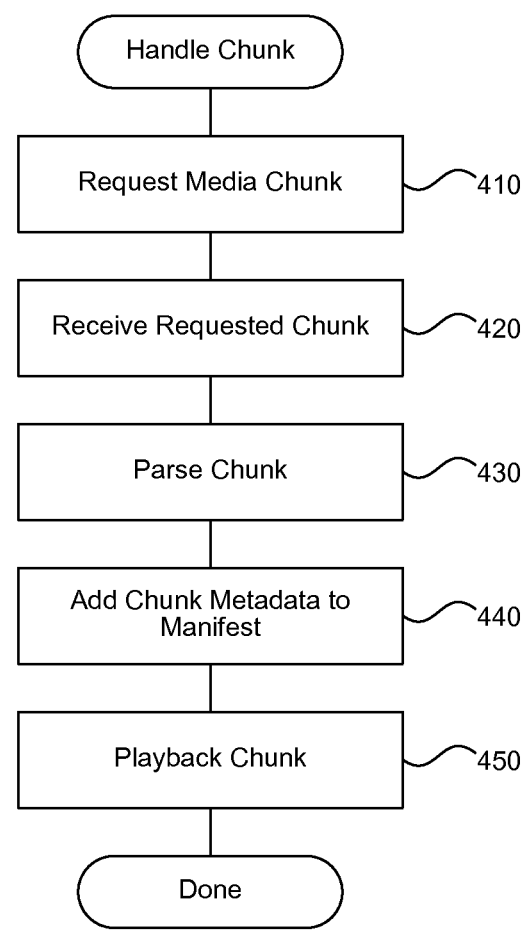
FIG. 4 is a flow diagram that illustrates the processing of the adaptive streaming system to handle a single media chunk, in one embodiment.

FIG. 4 is a flow diagram that illustrates the processing of the adaptive streaming system to handle a single media chunk, in one embodiment. Continuing in block 410, the system sends a request for a chunk from the client to a server over a network based on the selected initial bit rate. For example, the system may select a particular URL at which to request data based on the selected encoding (e.g., http://server/a.isml/quality/bitrate). Continuing in block 420, the system receives the requested chunk at the client. The system may receive the chunk from the server or from a cache between the server and the client on the network. Continuing in block 430, the system parses the chunk into a metadata portion and a media data portion. For example, each chunk may contain metadata that describes the encoding of the chunk and media data suitable for playback using a codec and appropriate hardware.

Continuing in block 440, the system adds the chunk metadata to an ongoing media manifest that describes information about a larger media element to which each of the media data chunks belongs. For example, the system may store a manifest in memory that contains the metadata from each chunk of a media file. Continuing in block 450, the system plays the media data using a codec identified by the chunk metadata and hardware of the client. The media data may include video, audio, and other types of data that the system plays back on hardware including a display, speakers, and so forth. Alternatively or additionally, the data may include non-audiovisual data (e.g., text) that is consumed in some other way than playback, in which case the system acts on the data based on the type of data. After block 450, these steps conclude.

In some embodiments, the adaptive streaming system provides digital video recorder (DVR)-like functionality for live media streams. In other words, users can pause a live stream, seek within the live stream, and so forth, without adding work or state tracking for the server. In a live stream, there are several scenarios like a missed scene, a pause to take a break, joining the event late and intend to watch from start, and so forth that are enabled by the system allowing the user to play chunks in various orders and at various times. Based on the assembled manifest described herein, the system offers the user control over how they watch a live stream. These controls are available today with TV via a DVR. The adaptive streaming system includes client controls to respond to user actions and manage playback of a live stream in a non-live mode by seeking to various locations in the manifest. In addition, the client can switch between live and non-live viewing during playback.

In some embodiments, the adaptive streaming system operates within a web browser plug-in. For example, the system may be included in a Microsoft Silverlight application. Microsoft Silverlight receives references in web pages to applications contained in containers called XAP files. Microsoft Silverlight extracts the XAP file and invokes the application. Microsoft Silverlight provides applications with a sandboxed, secure environment in which to run so that a user's computer system is protected from malicious or erroneous application code. Microsoft Silverlight provides APIs that applications can call to playback media in a way that shields the user's computer system and hardware from potentially harmful application actions. Thus, Microsoft Silverlight and other browser plug-ins can provide all of the functionality of an environment in which the adaptive streaming system expects to operate.

In some embodiments, the adaptive streaming system receives metadata of later chunks in a current chunk. For example, the server may hold a particular chunk that is ready until some number of additional chunks (e.g., two chunks) is available. Then, the server may send the chunk along with metadata information about the next few chunks. The client can use this information to know what is coming and adapt appropriately. This allows the client to intelligently adjust the request rate. For example, if a client requests a chunk and it does not have any information about later chunks, then the client knows it is requesting data too fast. If the client requests a chunk and receives information about too many later chunks, then the client may be requesting information too slow. Thus, the client can adapt using the advance metadata as a hint.

In some embodiments, the adaptive streaming system provides a plug-in model for heuristics to determine which encoding of media to use at a particular time. For example, the system may allow an administrator to select among several strategies for determining the bit rate at which to request media chunks based on a particular condition (e.g., reduced bandwidth or increased packet loss). In addition, content providers may include their own heuristics for determining the encoding to use, and may provide the heuristics as application modules or application dependency modules in an application package (e.g., a Microsoft Silverlight XAP) file that the client downloads when playing media from the content provider.

In some embodiments, the adaptive streaming system stores the assembled manifest described herein for later use, such as playback the day after a live event. During a live event, the client may have requested chunks of various encodings based on the network conditions. The client browser may also contain these chunks in the browser's cache. If the user requests to play back the media later, it may be most efficient to attempt to play back the media from the local cache, which generally means that the client requests the exact same chunks that were originally played. By storing the manifest with metadata from each chunk that was actually received, the client can play the media back continuously using the same encodings that were requested previously. This may enable the user to watch the media in scenarios, such as an airplane, where connectivity to the origin server may be unavailable.

In some embodiments, the adaptive streaming system provides logic for synchronizing related media streams. For example, a live audiovisual event may include one or more video streams (e.g., camera angles) and one or more audio streams (e.g., languages). As the client downloads the audio and video chunks separately, the system plays the audio and video media content in sync by aligning the time information associated with each chunk, as described further herein with reference to clock synchronization. The system may also synchronize other types of data, such as slides in a slide presentation, images, text, and so forth.

In some embodiments, the adaptive streaming system provides client-side logic for switching to different play rate streams (e.g., trick play) provided by the server. For example, the server may include 2×, 5×, 0.5×, and other speeds of playback. The client can switch to a stream of a different rate to provide the appearance to the user that the media is fast-forwarding (e.g., 2×) or rewinding (e.g., 0.5×). To switch, the client simply requests a different media chunk, e.g., at a different URL. The client can smoothly switch between playing chunks at the current rate and playing chunks at a different rate by continuing to play the particular chunks that are received. This provides a seamless experience to the end user with little latency between the user's request and the change in the media playback. This also saves network bandwidth as the client does not download, for example, 2 times the data to play media twice as fast, but rather downloads a reduced size encoding of the media that is encoded at the accelerated rate.

In some embodiments, the adaptive streaming system receives highlight markers in the metadata. A highlight may include any interesting segment of media, such as a point during a sporting event during which a player scored a goal. The client can play a highlight reel after an event has concluded by playing those chunks of the media with associated with highlight markers. If the client did not receive the live event, the client can request the manifest for the media and then request only those chunks corresponding to the highlights. If a user wants to see more of the media before and after the highlight (e.g., as indicated by the user fast-forwarding or rewinding), then the client can request additional chunks to play the requested portions of the media.

In some embodiments, the adaptive streaming system supports inline advertising and other non-audiovisual data (e.g., captions, comments, and so forth). For a live event, it may be unknown at the start of the event when commercial breaks will occur. An event coordinator may press a button during production when it is time for a commercial, causing the system to insert an advertising marker in the media stream metadata. When the client receives the advertising marker, the client may request and receive chunks associated with a previously identified advertisement. For example, the server may provide a list of potential advertisements in an initial manifest. The advertisement may be provided in chunks similar to other media, and may not be stored at the same server that provides the live event. Upon encountering an advertisement marker, the client pauses playback of the main stream, retrieves and displays the advertisement, and then resumes playback of the main stream.

In some embodiments, the adaptive streaming system determines which encodings are available based on a subscription or other payment model. For example, a content provider may charge more for a high definition (HD) version of a live event than a standard definition (SD) version of the event. In this case, the client may enable or disable switching to particular bit rates based on whether the conditions of the payment model have been met (e.g., the user's account is current). The content provider may offer some encodings free, such as a low bit rate or highlight only media, while charging for others.

The adaptive streaming system may request and receive media content in a variety of encodings. In some embodiments, the adaptive streaming system uses custom MP4 boxes. The Motion Picture Experts Group (MPEG) version 4 standard provides for boxes within the format that can contain custom data. The MP4 extension is the file format commonly associated with this version of content. The system may leverage boxes to include the custom metadata and media content chunks. Other media formats provide similar customization of content within a container and may be used by the system.

In some embodiments, the adaptive streaming system conforms to the guidelines of the Representational State Transfer (REST) style of software architecture for distributed hypermedia systems. One concept in REST is that an application can interact with a resource by knowing only the identifier of the resource (e.g., a URI) and the action requested (e.g., retrieval), and without knowing whether there are caches, proxies, gateways, firewalls, tunnels, or anything else between the application and the server actually holding the information. Following REST guidelines allows the system to benefit from existing Internet infrastructure and pre-existing resource conserving techniques such as caching. Some example RESTful principles that the system implements in some embodiments include: each URI identifies exactly one response, each URI points to a server resource that is stateless and cacheable, and each URI is intuitive and uses nouns (verbs are HTTP verbs). In particular, the system may avoid making requests using query strings and may use substantially unique keys for start times that are requested via URLs.

From the foregoing, it will be appreciated that specific embodiments of the adaptive streaming system have been described herein for purposes of illustration, but that various modifications may be made without deviating from the spirit and scope of the invention. Accordingly, the invention is not limited except as by the appended claims.

We claim:

1. A computer-implemented method for smoothly playing media on a client, the method comprising:
sending from the client a request for a chunk of media to a server over a network, wherein the chunk comprises a uniform portion of the media available from the server to multiple clients and wherein the request comprises a standard hypertext transfer protocol (HTTP) request that does not include byte ranges such that a corresponding response can be cached by a common Internet cache server that does not cache byte ranges;
receiving at the client the requested chunk;
parsing the chunk into a metadata portion and a media data portion: wherein an HTTP response header received with the requested chunk does not include a codec with which the media data portion of the chunk is encoded;
adding the chunk metadata to an ongoing media manifest that describes information regarding a larger media element to which the media chunk belongs; and
playing the media data using a codec identified by the chunk metadata and hardware of the client,
wherein the preceding steps are performed by at least one processor.

2. The method of claim 1 wherein receiving at the client the request chunk comprises receiving the chunk from an Internet cache before the request reaches the server and storing the chunk in a client cache.

3. The method of claim 1 wherein parsing further comprises identifying metadata that describes the encoding of the chunk and media data suitable for playback using a codec and appropriate hardware.

4. The method of claim 1 wherein the client stores a manifest in memory that contains the metadata from each chunk of a media file.

5. The method of claim 1 wherein the chunk metadata portion includes information regarding at least one subsequent chunk available from the server.

6. The method of claim 1 further comprising determining a bit rate of a subsequent chunk to request, wherein the determined bit rate is based on a count of information regarding subsequent chunks in the chunk metadata portion.

7. A computer system for smoothly processing media from a live event, the system comprising:

a processor and memory configured to execute software instructions;
a chunk request component configured to make requests from a client for individual media chunks from an origin server, wherein the chunks represent portions of a media file available individually from the server, and wherein each request comprises a standard hypertext transfer protocol (HTTP) request that does not include byte ranges such that a corresponding response can be cached by a common Internet cache server that does not cache byte ranges;
a chunk parsing component configured to interpret a format of each media chunk received by the chunk request component and separate the chunk into component parts, wherein an HTTP response header received with each requested chunk does not include a codec with which a media data portion of the chunk is encoded;
a manifest assembly component configured to build a manifest that describes a media element to which received media content chunks belong;
a media playback component configured to play back received media content chunks using client hardware;
a QoS monitoring component configured to analyze a result of receiving packets from the server and adapt client requests based on a set of current network conditions; and
a clock synchronization component configured to synchronize clocks of the server and the client so that the server and client can identify particular chunks based on time.

8. The system of claim 7 wherein the chunk request component requests chunks using HTTP GET requests.

9. The system of claim 7 wherein the chunk request component determines a user associated with the request and requests chunks based on a subscription level of the user.

10. The system of claim 7 wherein the client and origin server do not have a state-based connection between each other.

11. The system of claim 7 wherein the chunk request component identifies each chunk by a Uniform Resource Locator (URL) that individually identifies the chunk.

12. The system of claim 7 wherein the chunk parsing component separates the chunk into a header portion containing metadata and a data portion containing media content and wherein the chunk parsing component provides the metadata to the manifest assembly component and the media content to the media playback component and if the chunk contains non-audiovisual data parsing the chunk and consuming the non-audiovisual data.

13. The system of claim 7 wherein the manifest assembly component is further configured to include in the manifest information describing a codec and a bit rate used to encode each chunk.

14. The system of claim 7 wherein the manifest assembly component is further configured to receive requests to play a portion of the media element other than a current live position based on the manifest.

15. The system of claim 7 wherein the media playback component is further configured to invoke one or more codecs to interpret a container within which the media content is transported and to decompress media content from a compressed format contained in each media chunk.

16. The system of claim 7 wherein the QoS monitoring component is further configured to switch bit rates of the requested chunks by requesting chunks from a different server URL.

17. The system of claim 7 wherein the clock synchronization component is further configured to maintain a cadence of client requests to the server for subsequent media chunks.

18. A computer-readable storage device comprising instructions for controlling a computer system to playback media on a client, wherein the instructions, when executed, cause a processor to perform actions comprising:
- selecting an initial encoding at which to request encoded media from a server, wherein each request comprises a standard hypertext transfer protocol (HTTP) request that does not include byte ranges such that a corresponding response can be cached by a common Internet cache server that does not cache byte ranges;
- receiving a particular media chunk from the server, wherein an HTTP response header received with the requested chunk does not include a codec with which a media data portion of the chunk is encoded;
- playing the received media chunk;
- determining a quality of service (QoS) metric based on the received chunk; and
- upon determining that the QoS metric is too low and the client connection to the server cannot handle the current encoding,
- selecting a second encoding of the encoded media, wherein the second encoding of the encoded media is encoded at a lower bit rate than the initial encoding.

19. The device of claim 18 wherein selecting an initial bit rate comprises initially selecting a lowest available bit rate.

20. The device of claim 18 further comprising, upon determining that the QoS metric is high, selecting a third encoding of the encoded media, where the third encoding is encoded at a higher bit rate than the initial encoding.

* * * * *